Nov. 6, 1962 H. H. NEEDHAM 3,062,401
CLOSURE FOR A PRESSURE VESSEL
Filed Oct. 1, 1959
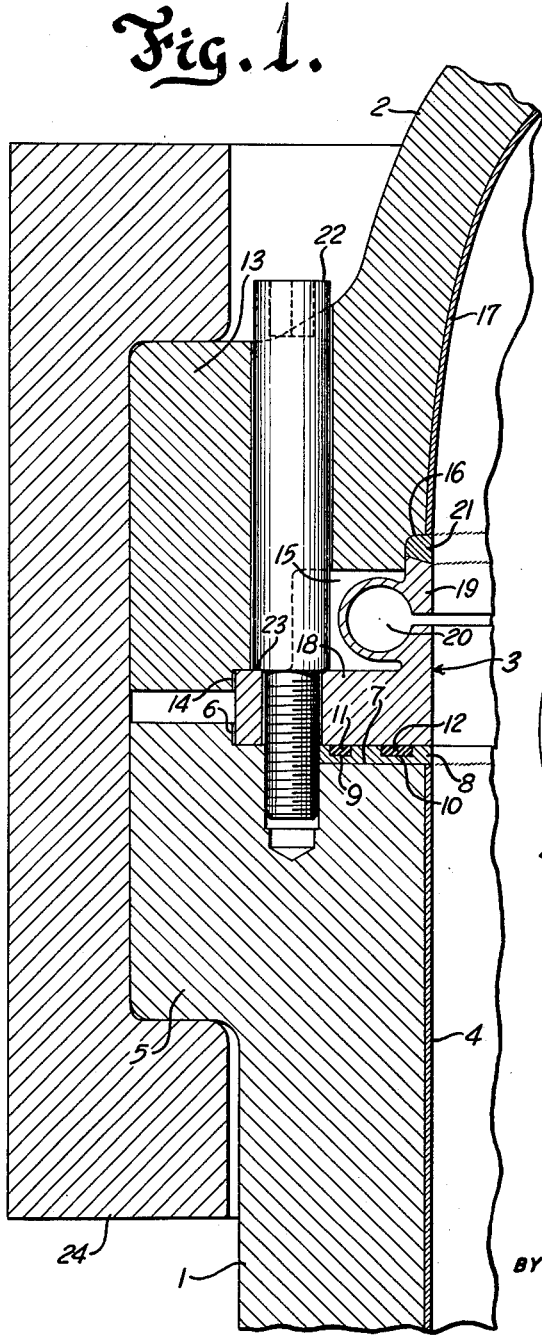
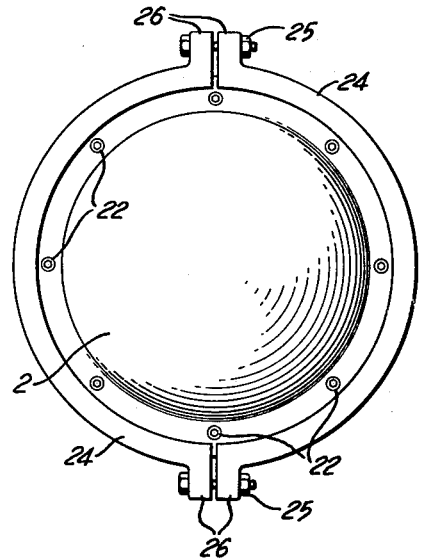
INVENTOR.
HOWARD H. NEEDHAM, DECEASED
BY MARGARET NEEDHAM, ADMINISTRATRIX
BY
Attorneys 3,062,401
CLOSURE FOR A PRESSURE VESSEL
Howard H. Needham, deceased, late of Wauwatosa, Wis., by Margaret Needham, administratrix, Wauwatosa, Wis., assignor to A. O. Smith Corporation, Milwaukee, Wis., a corporation of New York
Filed Oct. 1, 1959, Ser. No. 843,785
1 Claim. (Cl. 220—46)

This invention relates to a closure structure for pressure vessels subjected to high internal pressures and temperatures.

This invention provides a closure structure including a seal disposed in the joint between the head and shell of a heavy wall pressure vessel. The body of the seal is disposed in engagement with an annular gasket mounted in the end surface of the shell, and the seal is provided with an extension which defines an annular chamber exposed to the internal pressures of the vessel. With this construction, flexure of the seal due to temperature and pressure changes within the vessel will be reflected in a minimal increase or decrease in compression of the gasket thereby maintaining a tight joint seal at all times.

The use of the resilient seal embodied in this invention has the advantage of providing a positive seal of the joint formed by the head and shell of a pressure vessel though the vessel is subjected to varying degrees of internal temperature and pressure. The initial sealing pressure is provided by the sealing bolts. The sealing pressure is increased by the internal pressure of the vessel since the annular chamber is exposed to the internal vessel pressure and this pressure acts to exert a thrust upon the seal whereby it is brought to bear against the gasket by a force proportional to the internal vessel pressure.

Furthermore, with the use of the present seal, close tolerances on machining are not required and this reduces the cost and time of fabrication of the pressure vessel.

Other objects and advantages of the invention will appear in the course of the following description.

The drawings furnished herewith illustrate the best mode presently contemplated of carrying out the invention as set forth hereinafter.

In the drawings:

FIGURE 1 is a fragmentary vertical section of a pressure vessel showing the vessel shell and head in sealed relation; and FIG. 2 is an end view of the vessel.

As illustrated in FIGURE 1, the pressure vessel comprises a generally cylindrical shell 1 having an open end enclosed by head 2, and a seal 3 is located at the joint between the shell and head to seal the same.

The shell 1 is provided with a corrosion resistant lining 4 and has an outwardly extending peripheral flange 5. The end surface of the shell is provided with a pair of annular recesses 6 and 7 with recess 7 extending to the inner surface of said shell.

A corrosion resistant alloy 8 is deposited by welding in recess 7 and is machined to form a plurality of annular grooves 9 and 10. Resilient gaskets 11 and 12 are disposed in grooves 9 and 10.

The head 2 is formed with peripheral flange 13, and the end surface of the head 2 is provided with a series of annular, stepped recesses 14, 15 and 16 with recess 16 extending to the inner surface of the head. The inner surface of head 2 is lined with a corrosion resistant material 17 similar to shell lining 4.

As illustrated in FIGURE 1, seal 3 is formed of a corrosion resistant alloy, such as stainless steel, and includes an annular base 18 disposed within recesses 6 and 14 and which acts to engage and compress gaskets 11 and 12 forming the initial joint seal. Seal 3 is also provided with a resilient extension 19 which extends axially from annular base 18 and defines a deformable annular chamber 20 opening into the interior of the vessel. The extension 19 is disposed within recess 15 and the outer edge of the extension extends within recess 16 and is secured to head 2 by a weld 21. When resting upon seal 3, head 2 is balanced so that annular chamber 20 is slightly compressed.

In order to secure the head 2 and seal 3 to the shell 1, a series of circumferentially spaced bolts 22 are disposed within aligned openings in the head and the seal and are threaded into threaded apertures in the shell. The shoulder 23 on each of the bolts 22 engages the outer surface of annular base 18 and forces the annular base against gaskets 11 and 12, thereby providing the initial seal of the head and shell joint.

Annular base 18 bears against gaskets 11 and 12 forming the initial joint seal and the resilient extension 19 acts to reflect temperature and pressure variance within the vessel by expansion and contraction within recess 15. Moreover, the internal pressure acting within chamber 20 will exert a force against the base 18 to thereby maintain the seal at the gaskets 11 and 12.

The head is further secured to the shell by a split clamp ring 24 which engages shell flange 5 and head flange 13. The halves of the ring 24 are secured together by bolts 25 which extend through aligned openings in the flanges 26.

When pressure is applied within the vessel, the end thrust is carried almost entirely by split clamp ring 24. Pressure increases act to expand annual chamber 20 and force annular base 18 firmly in sealing relation against gaskets 11 and 12 thereby maintaining the sealing effect at the junction of the shell and head. Since seal 3 is made of a resilient alloy, the closure will also adjust itself to temperature change without danger of breaking the seal at the shell and head joint.

By making seal 3 of a corrosion resistant alloy and lining head and shell with a similar material, complete inner vessel surface protection against corrosion is provided.

Where bolted flanges are preferred, the use of a split clamp ring may be obviated by employing head and shell flanges of increased diameters and by disposing bolts 22 outwardly from their illustrated position and eliminating holes in annular base 18.

Various modes of carrying out the invention are contemplated as being within the scope of the following claims particularly pointing out and distinctly claiming the subject matter which is regarded as the invention.

What is claimed is:

A closure for a pressure vessel have a head and a shell, the head and shell being provided with complementing flanges bordering the open end surfaces thereof, one of the end surfaces being provided with a resilient member and the other of the open end surfaces being provided with an annular recess disposed adjacent the inner periphery thereof, comprising an annular seal adapted to seal the joint between the head and shell, the seal having first and second base elements connected by a resilient uninterrupted annular extension, the extension extending a distance axially from the peripherally innermost edge portions of the first and second base elements and defining a generally C-shaped annular chamber extending radially outwardly from the axially extending portions of the extension and communicating with the interior of the vessel, the C-shaped annular chamber being spaced axially from the first and second base elements, the first base element being provided between the head and shell and engaging the resilient member carried by the open end surface opposite the open end surface of the recess, the C-shaped chamber being disposed within the recess provided in the end surface and out of contact with the surfaces bordering the recess and free to expansibly respond to pressure fluctuations occurring within the vessel without initially transmitting the pressure fluctuations to the head and shell which would act to establish stresses tending to disrupt the seal, the second base element being attached to the axially innermost surface bordering the recess, and means for securing the head to the shell whereby the first base element of the annular seal is drawn tightly upon the resilient member to provide the initial seal of the joint between the vessel head and shell and whereby operational pressure fluctuations may be initially exerted upon the C-shaped chamber which may expansibly respond thereto thereby averting the exertion of damaging seal disrupting stresses upon the vessel.

References Cited in the file of this patent

UNITED STATES PATENTS

| | | |
|---|---|---|
| 1,567,813 | Oleson | Dec. 29, 1925 |
| 2,016,227 | Clausen | Oct. 1, 1935 |
| 2,133,934 | Ericsson et al. | Oct. 18, 1938 |
| 2,656,949 | Leupold | Oct. 27, 1953 |

FOREIGN PATENTS

| | | |
|---|---|---|
| 12,334 | Netherlands | Dec. 15, 1924 |